United States Patent [19]

Schumacher

[11] 4,062,688

[45] Dec. 13, 1977

[54] SET OF BASIC PRINTING INKS FOR PRODUCING COLOR TONES BY PRINTING METHODS

[76] Inventor: Ernst E. Schumacher, Gruneburgweg 129, D6 Frankfurt am Main 1, Germany

[21] Appl. No.: 741,780

[22] Filed: Nov. 15, 1976

[30] Foreign Application Priority Data

Nov. 18, 1975 Germany .............................. 2551689

[51] Int. Cl.² ........................ B41M 1/14; C09D 11/02
[52] U.S. Cl. ...................................... 106/20; 101/115; 101/135; 101/211; 106/22; 106/23
[58] Field of Search ............................ 106/20, 22, 23; 101/211, 115, 135

[56] References Cited

U.S. PATENT DOCUMENTS 3,951,668   4/1976   Schumacher et al. .................. 106/20

*Primary Examiner*—Herbert J. Lilling
*Attorney, Agent, or Firm*—Rummler & Snow

[57] ABSTRACT

A novel set of basic printing inks for producing improved color tones in multicolor printing comprising four individual inks of golden-yellow, carmin, violet, and turquoise hues, respectively, and having predetermined spectral intervals between their maximum density wavelengths, the maximum density of each of the intermediate pair of colors being substantially equidistant from the middle of the visible color spectrum.

6 Claims, 1 Drawing Figure

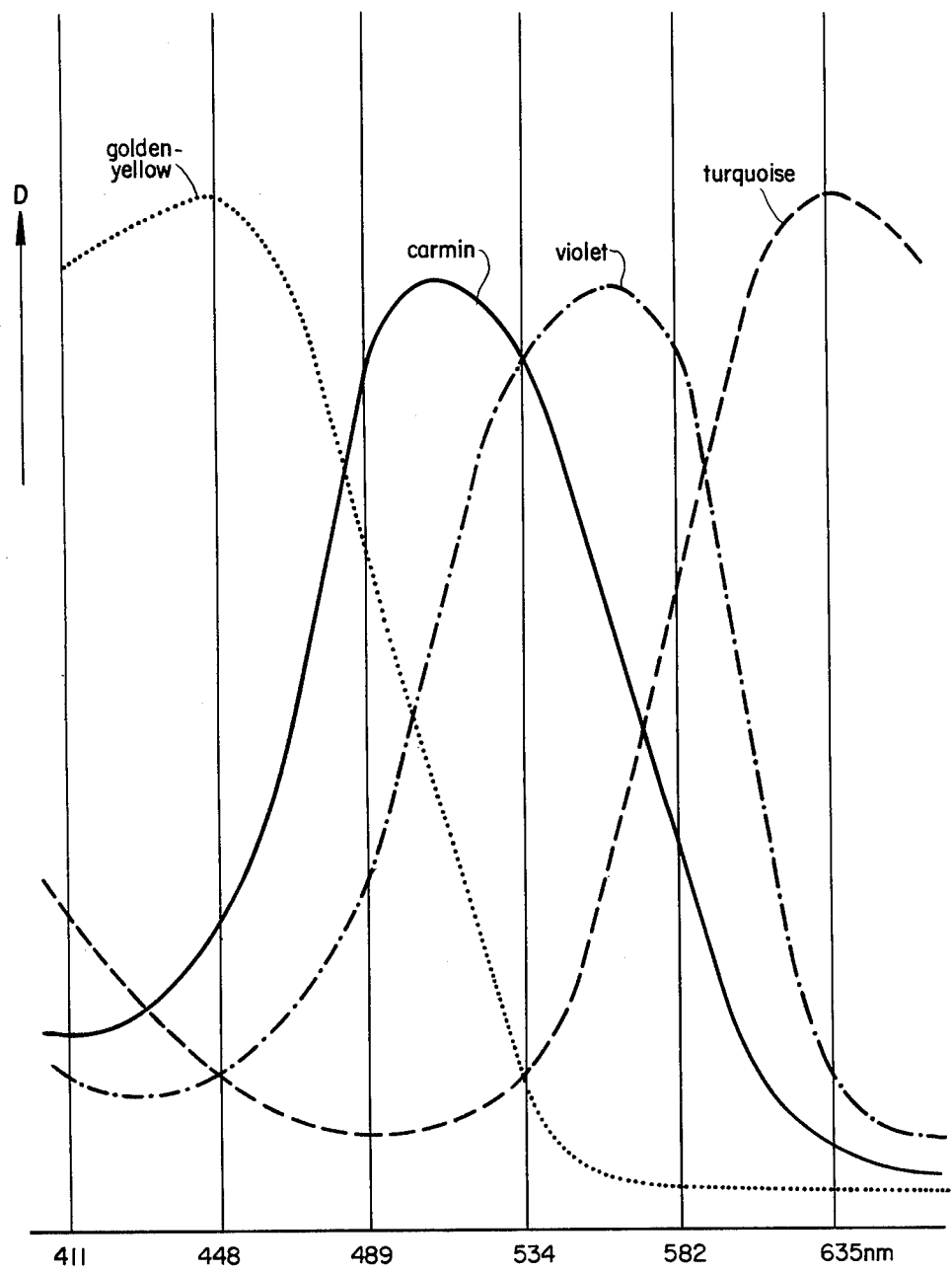

SET OF BASIC PRINTING INKS FOR PRODUCING COLOR TONES BY PRINTING METHODS

BACKGROUND OF THE INVENTION

For ideal multicolor printing, a set of inks must be selected in such a way as to be able to obtain the highest possible number of discernible color tones, each of which should be as free as possible of darkening effects.

All systems of printing inks, proposed up to now, are based on a set of three primary color inks, that is on the standardized primaries cyan, magenta, and yellow, as described in the German Standard DIN 16 538.

In the course of the practical application of such three color systems, however, a number of difficulties are apt to occur, i.e., some of the mixed color tones, obtained by overprinting, do not show brilliant color tones but appear dull and darkened as if they were overprinted with a gray ink.

As is well known, the degree of inking in multicolor printing can hardly be kept constant and when printing with the inks of the three-color-system, fluctuations in the amount of inking lead inevitably to clearly perceptive variations of the color tone or hue. It is particularly difficult to obtain a constant color balance when neutral tones must be printed which are composed of nearly similar percentages of all of the three primaries. It has heretofore been proposed to overcome these difficulties by the application of such a modification of the three color process whereby each one or at least two of the primaries are split into two inks, having the same color tone but different intensity. Also, there have been produced six-ink color prints, whereby besides yellow and black, a clearer and denser cyan and magenta have been applied each time. However, since the clearer and darker versions of these inks did not differ with respect to the spectral position of the density maximum, no gain in color effects could be expected.

The six-color-system represents only a very valuable version of the well-known three-color-system, which has proved itself to be advantageous, particularly in the case of printing processes wherein printing forms of the autotypical type are used.

In practical multicolor printing, it is usual to print, in addition to the three primary inks, a black ink from a fourth printing plate. In fact, the additional use of the black printer may contribute to a more constant performance of neutral tones but, on the other hand, it is evident that no improvement can be expected as to brilliant color rendition, particularly in the lighter color tones.

Also, it is well known in the printing practice to use one or more inks in addition to the standardized inks of the three-color system, for example in the printing of labels, packages, carton boxes, etc., so as to make certain that the special color tones, which are typical for the packaging of a definite product, appear permanently in a constant tone. Generally in the printing of packages, cartons, boxes, etc., the printer will not rely on the effects of overprinting primary inks but rather he prefers to use additional inks specially produced or selected to match the required color tone.

Such additional inks, however, do not have at all the character of primary inks of a three-color-system, since such inks are not selected under the viewpoint of the obtainability of a maximum number of color tones by overprinting.

DESCRIPTION OF THE DRAWING

The drawing appended hereto shows the spectral density curves of the four basic inks comprising an improved color set according to my invention. The drawing is self-explanatory with the exception that, unlike the usual spectral density diagrams, in this case the abscissa shows the color wavelengths in logarithmic progression.

DESCRIPTION OF THE INVENTION

It has been found that the deficiencies in color rendering occurring in the multicolor printing process, particularly when printing with printing forms of the autotypical type, are caused to a considerable extent by the fact that any three-color-system can only provide three colored inks to cover the totality of all color tones. From this, it follows that the three colors must be located in the visible spectrum with a relatively large spectral interval between adjacent pairs. A large spectral interval between two colors, however, means in turn a low degree of spectral affinity of these colors with each other.

In order to quantify the important reference value of "spectral affinity" between two colors, it is proposed to introduce here the term "affinity-quotient", represented by the letter Q, which is defined for the two colors F1-F2 as:

$$\frac{\text{Wavelength of maximum density of the color F1}}{\text{Wavelength of maximum density of the color F2}} = Q$$

For example, if F1 is turquoise with a maximum density wavelength of 645 nm (millimicrons) and F2 is violet with a maximum density wavelength of 560 nm, the affinity-quotient Q would be 1.151, (645)/(560) on one hand, or 0.868, (560)/(645) on the other hand.

It has been stated that the deficiencies in color rendering, as before mentioned, can only be reduced or even partly eliminated if the inks of the printing scale are selected in such a way that the affinity-quotient Q for each pair of adjacent colors does not exceed the value of 1.18 or pass below the reciprocal value of 0.85.

Tests have shown that these values should not be fully exploited, except in an extraordinary case. It should be attempted, instead, to stay with the values as 1.10 to 1.14, or 0.91 to 0.88, respectively, in order to reach a significant improvement with respect to the results of color printing.

It is clear, however, the tendency to reduce the spectral intervals between the pairs of basic colors must not be followed on account of a preferred limit in the total spectral interval of the density-maxima of all colors belonging to the complete color set the total spectral interval of the density-maxima of all colors belonging to one set (or scale) of inks being equal to the product obtained by multiplying the single values of the "affinity-quotient" (Q) between each pair of adjacent colors.

It has been found that a satisfactory rendition of the totality of the color tones is possible only under the condition that the product of all of the affinity-quotients reaches at least the value of 1.40. A higher value such as 1.46 is desirable.

The realization of this value in connection with the limit-value of the affinity-quotient, as mentioned above, leads according to my invention to a set of basic inks for producing color tones by printing methods, the set comprising four colored inks, having a sufficient degree of spectral affinity with each other, the degree of spectral affinity being characterized for each pair of adjacent inks by the quotient of the wavelengths of their maximum spectral densities, whereby the value obtained for any pair of adjacent colors should not exceed 1.18 or, in the case of the reciprocals, pass below 0.85, and whereby for all of the pairs of neighbored colors, the product of the quotients of the wavelengths of their maximum spectral densities will be 1.4 to 1.49, or 0.66 to 0.71, respectively.

When evaluating the results of overprinting, obtained with inks of the classic three-color-system, it can be stated that particularly the clearer carmin and violet tones are not reproduced satisfactorily. With the classic triad, it was necessary to compose carmin and violet by magenta on the one side and yellow or cyan, respectively, on the other side, which explains the reason for the mentioned deterioration of the clearer steps of these color tones.

According to my invention, these color tones of carmin and violet are represented by individual inks, whereby the spectral interval of the density maximum of these colors is particularly small. Magenta, a principal of the classic three-color-system, will be originated in the proposed four-color-system by overprinting of the new basic colors, carmin and violet.

According to my invention, it is proposed to spectrally locate the basic ink colors of the new four-color-system in such a way the the density maximum of carmin becomes 510 ± 10 nm and the density maximum of violet becomes 560 ± 10 nm. The spectral bands 510 nm and 560 nm are substantially equidistant from the spectral center of the visual spectrum, especially located at 535 ± 5 nm.

In a similar way, the two further colors of the proposed four-color-system may be spectrally located on the basis of the above mentioned formula for the spectral interval (affinity-quotient) of the adjacent primaries. This leads to the new basic ink colors, "golden-yellow" and "turquoise" having their density maxima in the spectral band 425 to 450 nm and 620 to 645 nm, respectively.

Summing up, the complete four-color basic ink set according to the invention is characterized by the colors golden-yellow, carmin, violet and turquoise having their density maxima at the wavelengths 425 to 450 nm, 510 ± 10 nm, 560 ± 10 nm, and 620 to 645 nm, respectively.

I claim:

1. A basic set of inks for producing color tones by printing methods, the set comprising four individual colored inks having a degree of spectral affinity with each other characterized, for each pair of adjacent inks, by the quotient of the wavelengths of their maximum spectral densities being in no case more than 1.18 or less than 0.85.

2. A basic set of inks for producing color tones by printing methods, the set comprising four individual colored inks having a sufficient degree of spectral affinity with each other that for each pair of adjacent colors the quotient of the wavelengths of their maximum spectral densities will be no more than 1.18 or less than 0.85, and whereby the product of the quotients of the wavelengths of the maximum spectral densities of all of the pairs of adjacent colors will be in the range of 1.40 to 1.49 when the dividend for each quotient is the larger number or, conversely, 0.66 to 0.71.

3. A basic set of inks for producing color tones by printing methods, the set comprising four individual colored inks having a degree of spectral affinity with each other characterized, for each pair of adjacent inks, by the quotient of the wavelengths of their maximum spectral color densities being in no case more than 1.18 or less than 0.85, and whereby for all of the pairs of adjacent colors the product of the quotients of the wavelengths of their maximum spectral densities will be in the range of 1.40 to 1.49 when the dividend for each quotient is the larger number or, conversely, 0.66 to 0.71.

4. A set of basic inks as defined by claim 1 wherein the four colors comprise the color tones of golden-yellow, carmin, violet, and turquoise, the spectral position of the density-maxima of which coincide with the wavelengths 425 to 450 nm, 510 ± 10 nm, 560 ± 10 nm, and 620 to 645 nm, respectively.

5. The method of producing a set of basic inks for color printing comprising the steps of selecting a pair of colors substantially equidistant from the center of the visual color spectrum and wherewith the affinity-quotient of their wavelength densities is not greater than 1.18 or less than 0.85, and then selecting an additional pair of colors, one for each side of the said visual spectrum center, each with a spectral interval from the respective one of the first mentioned primary colors sufficient to provide an affinity-quotient not greater than 1.18 or less than 0.85.

6. The method of producing a set of basic inks for color printing according to claim 5 wherein the product of all of the affinity-quotients of the three pairs of adjacent primaries will be 1.40 to 1.49 or 0.66 to 0.71.

* * * * *